(12) United States Patent
Shoji et al.

(10) Patent No.: US 7,395,541 B2
(45) Date of Patent: Jul. 1, 2008

(54) COMPUTER INTERFACE DRIVER PROGRAM

(75) Inventors: Koichiro Shoji, Kanagawa (JP); Hitoshi Shimura, Kanagawa (JP); Jianping Wei, Kanagawa (JP); Tomoyuki Kawade, Kanagawa (JP); Takashi Nozaki, Kanagawa (JP); Hideaki Miura, Kanagawa (JP)

(73) Assignee: Science Park Corporation, Kanagawa (JP)

( * ) Notice: Subject to any disclaimer, the term of this patent is extended or adjusted under 35 U.S.C. 154(b) by 679 days.

(21) Appl. No.: 10/332,539

(22) PCT Filed: Apr. 30, 2002

(86) PCT No.: PCT/JP02/04318

§ 371 (c)(1),
(2), (4) Date: Jan. 10, 2003

(87) PCT Pub. No.: WO02/091195

PCT Pub. Date: Nov. 14, 2002

(65) Prior Publication Data

US 2004/0216141 A1 Oct. 28, 2004

(30) Foreign Application Priority Data

Apr. 30, 2002 (JP) .............................. 2001-136135

(51) Int. Cl.
*G06F 3/00* (2006.01)
(52) U.S. Cl. ...................................................... 719/321
(58) Field of Classification Search ................. 719/321
See application file for complete search history.

(56) References Cited

U.S. PATENT DOCUMENTS 6,205,492 B1 * 3/2001 Shaw et al. ................. 719/321
6,763,472 B2 * 7/2004 Warwick et al. ............ 713/320
6,952,830 B2 * 10/2005 Madineni et al. ............ 719/321

FOREIGN PATENT DOCUMENTS

| EP | 1 033 656 A1 | 9/2000 |
| JP | 09-164770 A1 | 10/1998 |
| JP | 2000-057079 A1 | 2/2000 |
| JP | 20001249840 A * | 3/2000 |
| JP | 02001069160 A * | 3/2001 |
| JP | 2001-520774 A1 | 10/2001 |
| WO | WO 98/47074- | 10/1998 |

* cited by examiner

*Primary Examiner*—William Thomson
*Assistant Examiner*—Lechi Truong
(74) *Attorney, Agent, or Firm*—Rader, Fishman & Grauer, PLLC (57) ABSTRACT

The present invention provides a common interface among device drivers 5 operating in the kernel 8, for increasing data transfer speeds and improving data integrity. A common interface driver 7 is provided among device drivers 5, which control devices 6 connected to a computer. The common interface driver 7 operates in the kernel mode 8 and provides an interface with the application program 4. The common device driver 7 receives and analyzes commands from the application program 4 and outputs instructions to each of the device drivers 5.

4 Claims, 11 Drawing Sheets

COMPUTER INTERFACE DRIVER PROGRAM

BACKGROUND OF THE INVENTION

1. Field of the Invention

The present invention relates to an interface driver program for a computer for controlling interactions among device drivers of the computer. More specifically, the present invention relates to the interface driver program for a computer which is an interface among device drivers operating in a kernel mode, and an interface among device drivers and application programs.

2. Description of the Related Art

A computer comprises many hardware resources, such as a central processing unit (CPU), storage devices (memory, hard disk, etc.), input devices (keyboard, mouse, etc.), output devices (display, etc.), and card slots for connecting to peripheral devices (printer, scanner, etc.). This hardware is controlled by and operates according to an OS (operating system) stored in the storage device.

Various application programs, operating on a computer, run on the OS. The OS controls all operations of the computer, internalizes the differences in different hardware specifications, and provides a common environment for application programs. In effect, the OS is the software for providing basic functions shared by many application programs, such as input/output functions for keyboard input and screen output, and disk and memory management, and for controlling the entire system of the computer. The OS is sometimes called "basic software".

Computer hardware is manufactured by a plurality of makers and has different specifications depending on the maker. It is desirable to develop application programs such that the user is not conscious of differences in these hardware specifications. The OS internalizes these differences in the hardware specifications and provides a common environment for application programs.

The developers of application programs can put less work into development by using the functions provided by the OS and standardize the operational properties of application programs. Application programs developed for a particular OS can basically be used on any computer whereon that OS is running.

MS-DOS (registered trademark), UNIX (registered trademark), Linux, FreeBSD (registered trademark), and so on are representative of the many types of OS's. The Windows series from Microsoft is the most popular OS for enterprise and general household users. The Mac OS (registered trademark) from Apple is widely used in the areas of DTP and multimedia. Various flavors of UNIX OS's and UNIX-based OS's such as Linux and FreeBSD, available at no cost, are widely used for company servers and by academic institutions. In recent years, Microsoft Windows NT/2000 (registered trademark) has been expanding its share of the server OS market.

[Conventional Architecture]

Figure 9:
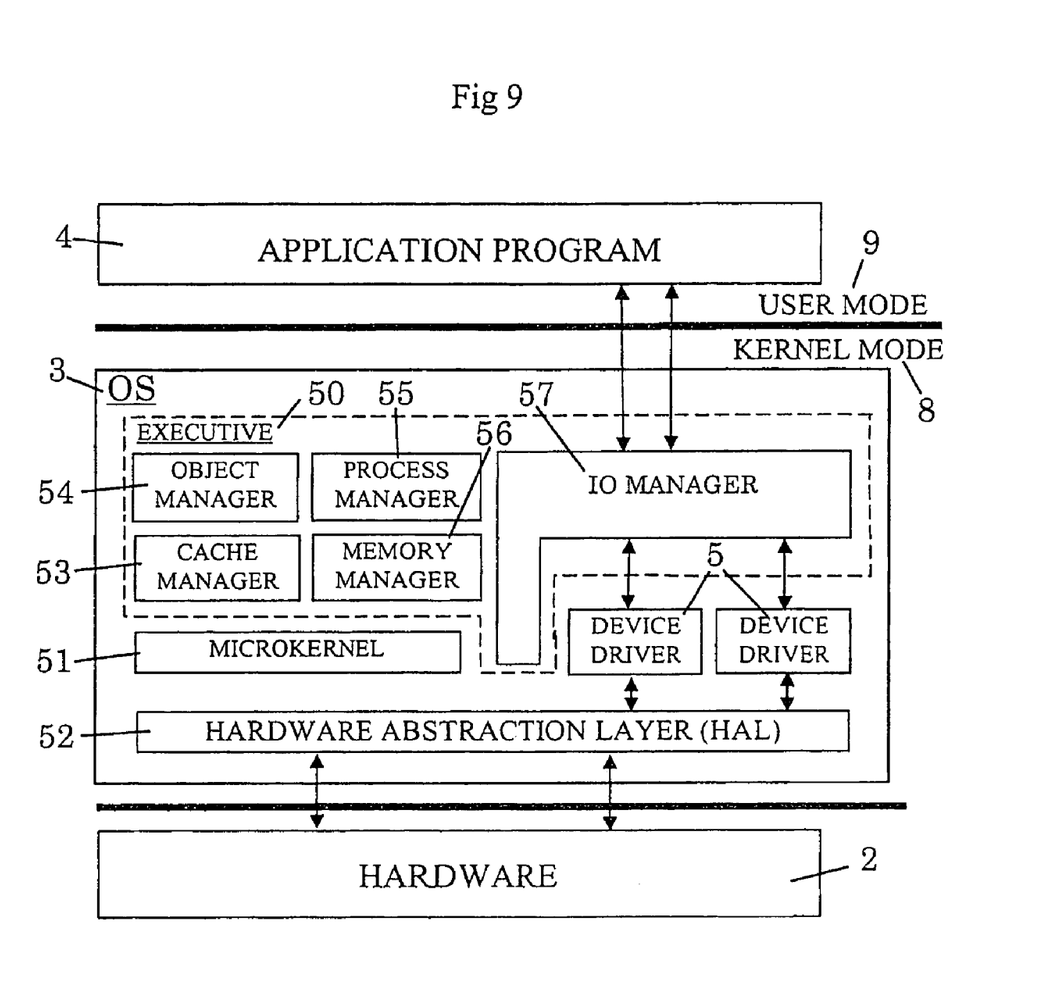
FIG. 9 is a drawing showing the Windows architecture.

FIG. 9 shows a schematic of the Windows NT/2000 (registered trademark) architecture as a representative OS. As understood from FIG. 9, Windows NT/2000 has an overall layered structure comprising the hardware 2, OS 3, and application programs 4 for realizing the functions actually requested by users.

The kernel mode 8 is constituted of the various types of software (kernel mode software) operating on that layer, and centering around the microkernel 51. The application program 4, in the uppermost layer, operates in the user mode 9. The OS 3 generally comprises an executive 50, microkernel 51, and hardware abstraction layer (HAL) 52. The HAL 52 is a program which focuses on the control of hardware located in the layer immediately above the hardware 2. This is a program for internalizing the various and assorted hardware and specifications, such as of the processor, and for providing the same environment to upper level services (microkernel 51, executive 50, etc.).

The microkernel 51 provides the basic functions of the entire system. The executive 50 is an aggregate of programs for realize the provision of the main services of the OS 3 by using services provided by the microkernel 51 and HAL 52. The executive 50 includes representative executive programs such as a cache manager 53, object manager 54, process manager 55, memory manager 56, and I/O manager 57.

The object manager 54 is a program for monitoring, and controlling and regulating, existing objects. The process manager 55 is a program for monitoring and regulating operating processes. The cache manager 53 and memory manager 56 are programs for controlling and regulating memory and virtual memory. The I/O manager 57 is a program for monitoring and controlling the input/output functions of the OS. When the computer is operating with this executive 50, this is called the kernel mode 8.

In the kernel mode 8, all commands for operating the OS 3 can be executed and when a command is executed by mistake, it can have a negative influence on the system as a whole. Also, there is a user mode 9 which is completely open to users of application programs or the like. In this user mode 9, commands for operating the OS 3 are controlled so as not to have a negative influence on the system. Because the system automatically captures commands which would have a negative influence on the system, this becomes a very easy to use environment for the user.

The establishment of this type of control is the same as controlling the functions of the OS 3, and application programs 4 running in the user mode become unable to directly access portions relating to the hardware 2 and must go through the kernel mode 8. The kernel mode 8 can fully use the functions of the OS 3 and has complete access to each of the input/output devices. Also, programs operating in the kernel mode 8 are processed with greater priority than programs in the user mode 9 and high performance can thereby be attained.

The device drivers 5 are software associated with the OS 3 and have the purpose of controlling hardware external to the computer, and run in the kernel mode 8. Normally, there is a device affiliated with each device driver 5. Application programs 4 running in the user mode 9 must go through the device drivers 5 to access each device.

Figure 10:
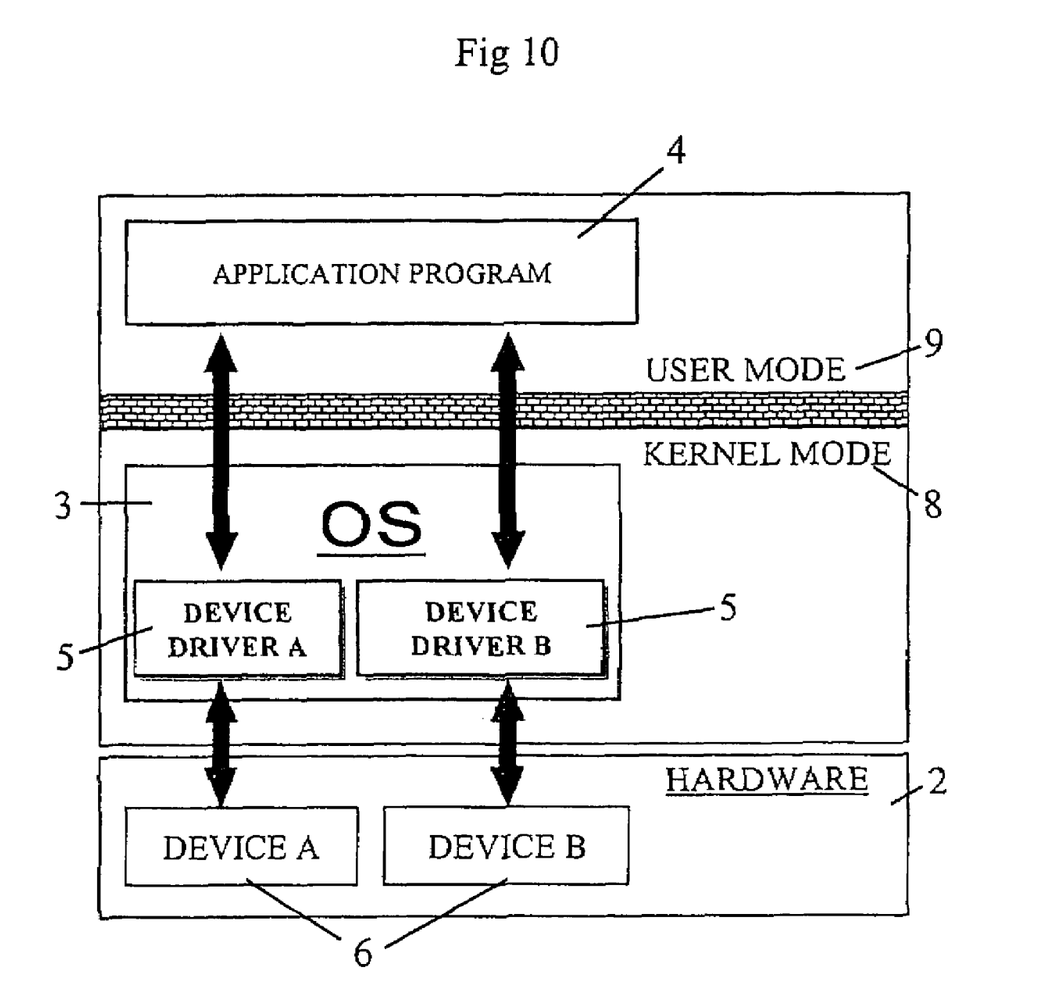
FIG. 10 is a schematic of a conventional OS and device driver.

In the case of transferring data from the device A to the device B as shown in FIG. 10, for example, the flow of data becomes as follows: device A>device driver A>(switch operating mode from kernel mode 8 to user mode 9) application program 4 (switch operating mode from user mode 9 to kernel mode 8)>device driver B>device B. This system continues with processing while switching the operating mode from kernel mode 8 to user mode 9, or from user mode 9 to kernel mode 8.

The switching between the user mode 9 and kernel mode 8 is a process which takes time. When a large quantity of data, such as image data, is transferred, the transfer speed becomes slow and the transfer takes time. For this reason, it is difficult to improve the transfer speed at the application level. This is because it is necessary to switch between the user mode 9 and kernel mode 8 for each process of the application program 4.

The conventional operation procedure when transferring data among devices is explained. FIG. 10 shows a schematic of the relationship among the application program 4, device drivers 5, and operating modes 8 and 9. As understood from the drawing, the application program 4 operates in the user mode 9.

The device drivers 5 are combined with the OS 3 and operate in the kernel mode 8. The devices 6 constituting the hardware 2 of the computer comprise various types of internal devices and external devices connected with the computer, and are controlled only by their respective device drivers 5. In effect, access to the devices 6 is carried out through the device drivers 5. The device drivers 5 operate according to commands from the application program 4 through the OS 3.

Figure 11:
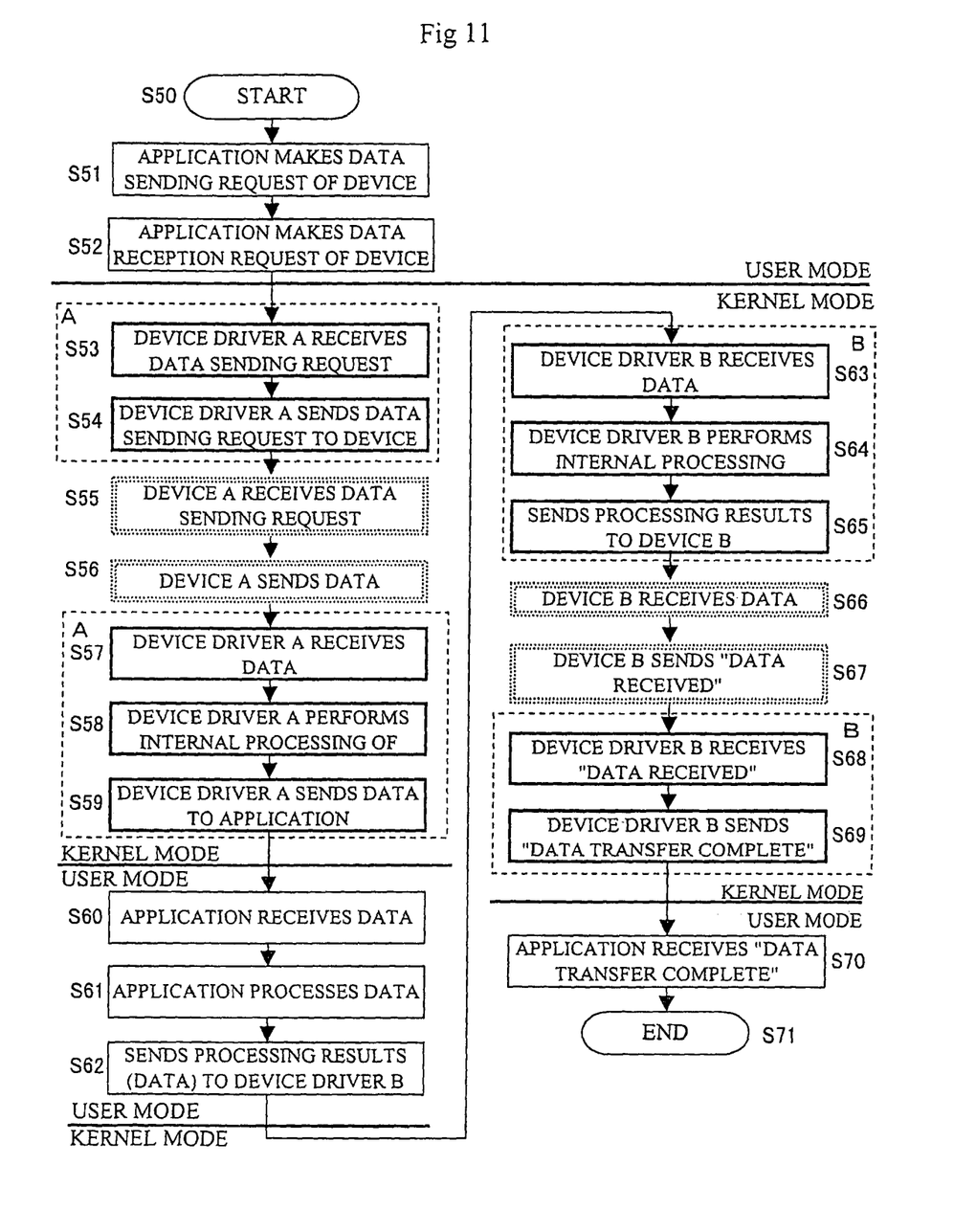
FIG. 11 is a flowchart showing operating procedures of the conventional device driver.

The flow of the data transmission is explained next with reference to the flowchart in FIG. 11. The flow of data when an application program 4 operating in the user mode 9 transfers data from the device A to the device B is explained while comparing the operating modes 8 and 9 of the system. The application program 4 outputs a data transfer request (command) (S50).

At this time, a data sending request is output to the device A (S51) and a data reception request is output to the device B (S52). The system operating mode changes from the user mode 9 to the kernel mode 8. The device driver A receives the data sending request (S53) and sends [the request] to the device A (S54). The device A receives the data sending request (S55) and sends the data (S56). The device driver A receives the data sent (S57), performs internal processing (S58), and sends the data to the application program 4 (S59).

The system operating mode changes from the kernel mode 8 to the user mode 9; and the application program 4 receives data, performs processing (S60, S61), and sends the processing results to the device driver B (S62). The system operating mode again changes from the user mode 9 to the kernel mode 8. The device driver B receives the data (S63), performs internal processing (S64), and sends the results to the device B (S65).

The device B receives the data (S66), and sends "data received" information to the device driver B (S67). The device driver B receives the "data received" information (S68), and notifies the application program 4 that data transfer is complete (S69). The system changes to the user mode 9; and the application program 4 receives the [notification] that data transfer is complete (S70) and switches to the next process, and the series of data transfer processes comes to an end (S71).

In this way, the data are transferred as follows: device A>device driver A>(switch operating mode) application program 4 (switch operating mode)>device driver B>device B. During this time, the system operating mode is repeatedly switched between the kernel mode 8 and user mode 9 in the operation. When a large quantity of data is being handled, the operating mode is switched a large number of times.

Furthermore, when another application program is running on the system at the same time, the operating mode is switched a large number of times for the system as a whole because the system switches operating modes for that [other] application as well. This becomes a factor in the slowing of execution processing among the application programs. The increased switching of the operating mode reduces the speed of the data sending and receiving process. This cannot help but become a factor in the disruption or the like of images displayed on screen, particularly in the case where real time [processing] is a major demand, such as in image processing.

In order to ensure system performance in this type of system, the development and engineering of device drivers for controlling hardware 2 becomes important, along with the development and design of the hardware. Especially when transferring large quantities of data such as image data, it is desirable to reduce the switching between the user mode 9 and kernel mode 8 and increase the speed of data transmission. When the integrity of the data is a major requirement, it is desirable to make the transfer within the kernel mode 8 which the user cannot touch.

SUMMARY OF THE INVENTION

The present invention was made on the basis of the technical background discussed above and achieves the following objects.

It is an object of the present invention to provide an interface driver program for a computer which can provide a common interface for application programs and device drivers.

It is another object of the present invention to provide an interface driver program for a computer which can provide a common interface for device drivers operating in the kernel mode, and increase the speed of data transfer.

It is another object of the present invention to provide an interface driver program for a computer which can provide the abovementioned common interface, and the safe transfer of data for which data security is protected.

In order to achieve the abovementioned objects, the present invention employs the following means.

In an interface driver program for a computer to which a plurality of devices is connected and which operates according to an OS:

device drivers for controlling the abovementioned devices are present in the abovementioned devices; and when data are sent and received among the abovementioned devices according to commands output from an application program running on the abovementioned computer, a common interface performs the sending and receiving of data or commands from the abovementioned application program to the abovementioned device drivers.

Also, the abovementioned devices comprise a first device and second device;

a first device driver for controlling the abovementioned first device is present;

a second device driver for controlling the abovementioned second device is present; and the interface driver program may comprise:

application interface means for receiving commands from the abovementioned application program and notifying the abovementioned application program of the results of executing the commands;

first interface means for fetching received data from the abovementioned first device driver;

second interface means for sending the sending data to the abovementioned second device driver; and data processing means for processing the abovementioned received data, generating the abovementioned sending data, and passing the abovementioned sending data to the abovementioned second interface means.

Furthermore, the abovementioned OS has the operating modes of a kernel mode wherein all commands for operating the abovementioned OS can be executed, and a user mode wherein only some of the abovementioned commands can be executed; and the abovementioned interface driver program for a computer operates in the abovementioned kernel mode.

The interface driver program for a computer also comprises:

the abovementioned first device being an imaging device 15 for capturing image data;

the abovementioned second device being a network card 16 for connecting to a network 13, and sending the abovementioned image data to said network 13;

wherein the abovementioned first interface means 18 fetch the abovementioned image data from the abovementioned imaging device 15;

the abovementioned data processing means 19 process the abovementioned image data sent from the abovementioned first interface means 18, and generate sending image data to be sent to the abovementioned network 13; and the abovementioned second interface means 20 send the abovementioned sending image data from the abovementioned data processing means 19 to the abovementioned network 13.

The abovementioned data processing means 19 may perform calibration processing such as color calibration, compression processing, encryption processing, packetizing processing, image file format modification processing, or frame sampling processing of the abovementioned image data.

The interface driver program for a computer also comprises:

the abovementioned first device being a bar code reading device 28 for reading bar code data;

the abovementioned second device being a network card 16 for connecting to a network 34 and sending the abovementioned bar code data to the abovementioned network 34;

the abovementioned first interface means 18 fetching the abovementioned bar code data from the abovementioned bar code reading device 28;

the abovementioned data processing means 19 processing the abovementioned bar code data sent from the abovementioned first interface means 18, and generating sending bar code data to be sent to the abovementioned network 34; and the abovementioned second interface means 20 sending the abovementioned sending bar code data from the abovementioned data processing means 19 to the abovementioned network 34.

The abovementioned data processing means 19 may perform calibration processing, compression processing, encryption processing, or packetizing processing of the abovementioned bar code data.

Also, the abovementioned index server 31, which has a function for converting the abovementioned bar code data to URL address data, may be present in the abovementioned network 34;

the abovementioned second interface means 20 acquire the abovementioned URL address data from the abovementioned index server 31 through the abovementioned network card 16; and the abovementioned application interface means 17 pass the abovementioned URL address data to the abovementioned application program 4.

Furthermore, the abovementioned network 13, 34 may be the Internet, a public wireless telecommunications network, or a public wired telecommunications network.

The abovementioned URL address data may be an IP address. The abovementioned URL address data may be encrypted.

The abovementioned index server 31 may double as the abovementioned computer.

The abovementioned interface driver program for a computer may have a recording medium for recording that interface driver program for a computer.

DETAILED DESCRIPTION OF THE PREFERRED EMBODIMENTS

Figure 1:
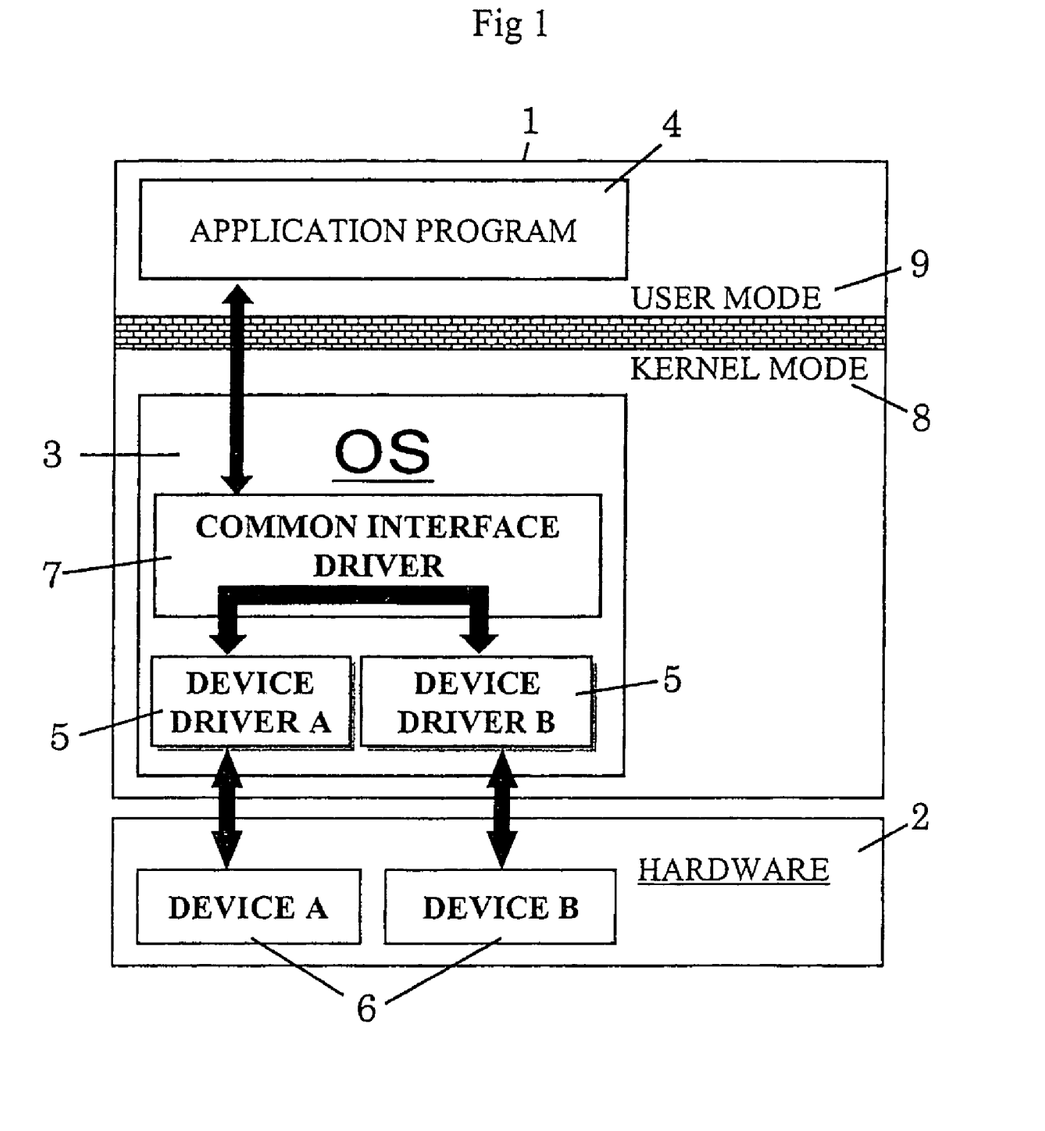
FIG. 1 is a schematic showing an embodiment of the present invention.
Figure 2:
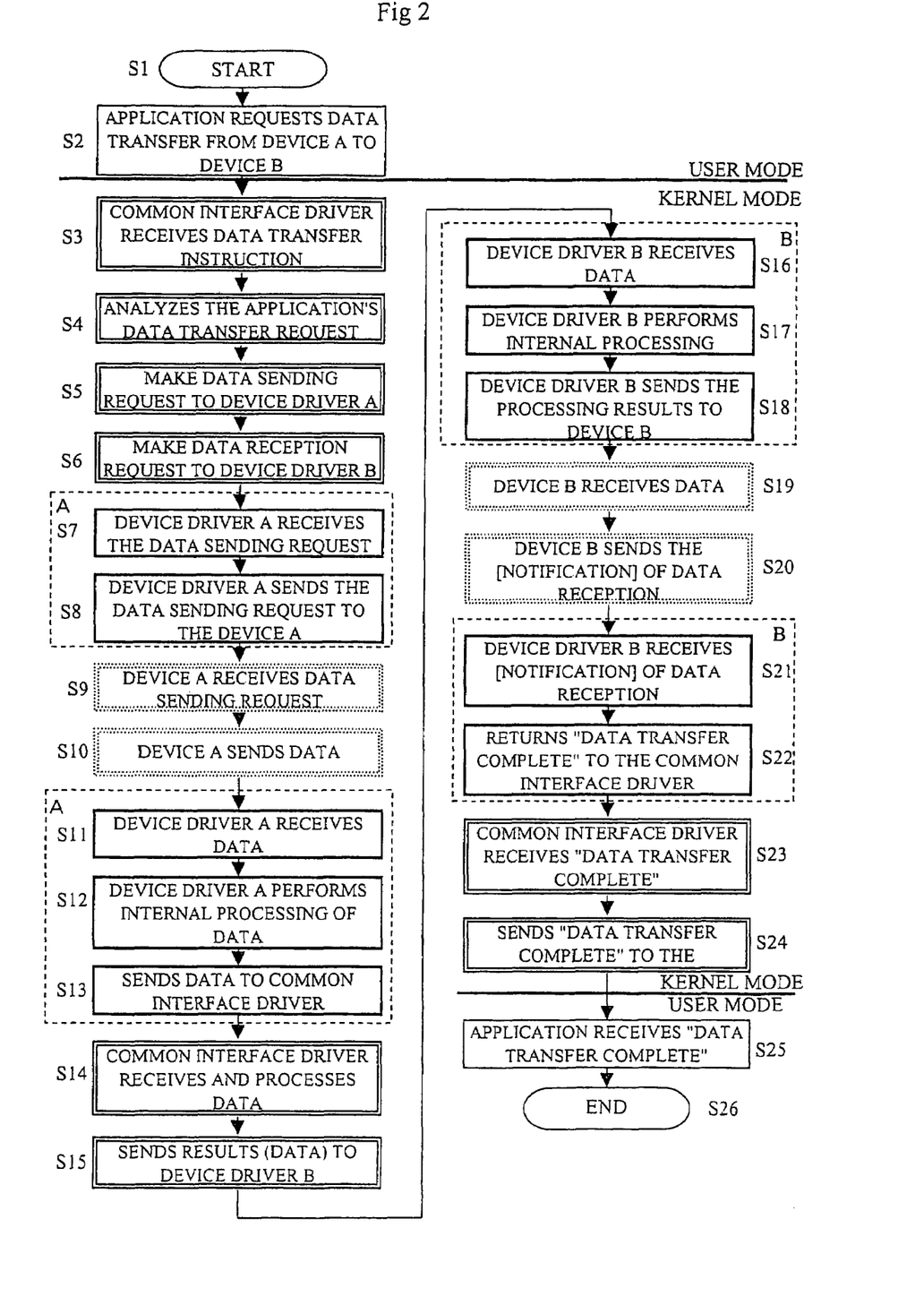
FIG. 2 is a flowchart showing the operation of an embodiment of the present invention.

The preferred embodiments of the present invention are explained next. FIG. 1 is a schematic drawing showing an embodiment of the interface driver program for a computer relating to the present invention, and a schematic of an OS using a common interface driver. FIG. 2 is a flowchart showing the flow of data and commands when data are transferred.

The computer 1 comprises hardware 2 such as a CPU, memory, and peripheral devices. This hardware 2 operates under the control of an OS 3 stored in a storage device. An application program 4 used by an end user operates in an environment provided by the OS 3. The OS 3 includes device drivers 5 for controlling peripheral devices. The device drivers control devices 6 according to commands from the application program 4, and receive data from the devices 6 and send data to the devices 6.

In the present embodiment, a common interface driver 7 provides a common access point for each of the device drivers 5 and collects together exchanges with the application program 4. The sending and receiving of data among the devices 6 according to commands from the application program 4 can also be controlled. The common interface driver 7 is an interface between a device driver 5 and a device driver 5, and operates in the kernel mode 8.

The devices 6 include a device A and a device B; a device driver A and device driver B control these respectively. FIG. 2 shows a flowchart of the flow of data in the case of transferring data from the device A to the device B. When the application program 4 which operates in the user mode 9 transfers data from the device A to the device B (S1), [the program] outputs a data transfer request (command) (S2). At this time, the operating mode of the system is the user mode 9.

The operating mode of the system switches to the kernel mode 8, and the common interface driver 7 receives the data transfer request from the application program 4 (S3). The common interface driver 7 analyzes the data transfer request (S4) and outputs instructions to each processing portion. [The interface driver 7] outputs a data sending request to the device driver A (S5) and a data reception request to the device driver B (S6).

The device driver A receives the data sending request from the common interface driver 7 (S7) and sends [the request] to the device A (S8). The device A receives the data sending request (S9) and sends data to the device driver A (S10). The device driver A receives the data (S11), performs internal processing (S12), and passes [the data] to the common interface driver 7 (S13). The common interface driver 7 receives the data, performs processing such as compression and encryption (S14), and sends the results to the device driver B (S15).

The device driver B receives data from the common interface driver 7 (S16), performs internal processing (S17), and sends the results of that internal processing to the device B (S18). The device B receives the data (S19), and sends the data reception information to the device driver B (S20). The device driver B receives that data reception information (S21), and sends the information regarding the completion of the data transfer to the common interface driver 7 (S22).

The common interface driver 7 receives the information regarding the completion of the data transfer (S23), sends the information regarding the completion of data transfer to the application program 4, and waits for the next command (S24). Here, the system operating mode switches from the kernel mode 8 to the user mode 9, and the application program 4 receives the information regarding the completion of data transfer (S25), and begins the next process.

The series of data transmission operations ends with this (S26). In this way, the data are transferred as follows: device A>device driver A>common interface driver 7>device driver B>device B. During this time, the system operating mode runs in the kernel mode 8 and it is not necessary to switch modes. Also, the data are transferred between the devices 6 directly in the kernel mode 8, and without going through the application program 4 in user mode 9, and it becomes possible to transfer large quantities of data very quickly. Also, the integrity of the data is also improved because the data are transferred in the kernel mode 8 from which the application program 4 cannot directly interact.

[Network Image Processing System]

Figure 3:
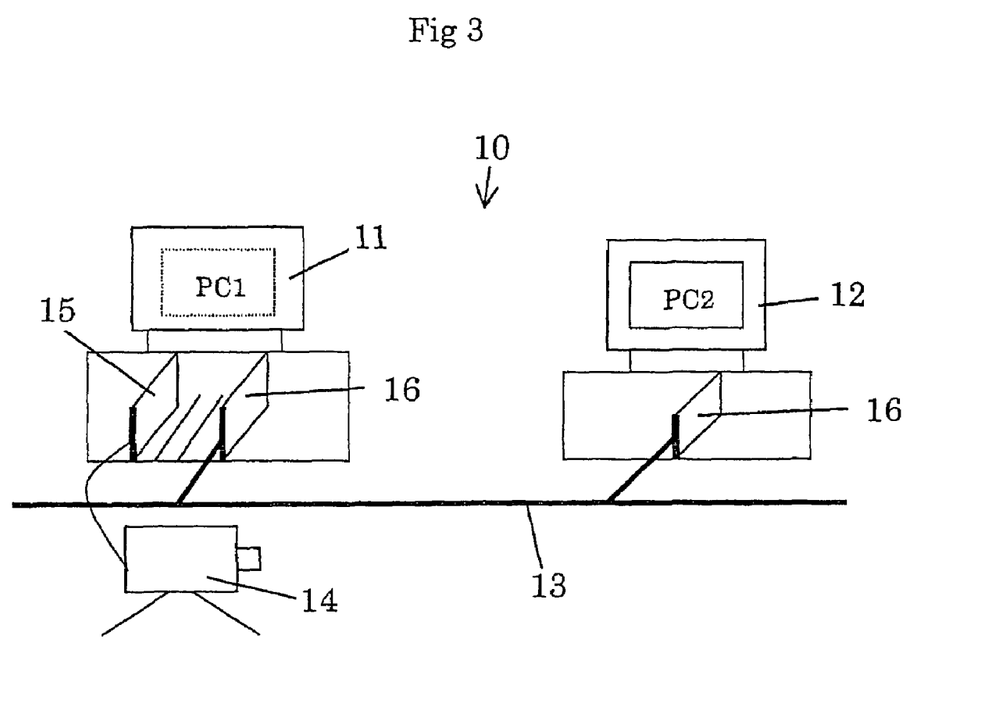
FIG. 3 is a schematic of a network image processing system.

Explained here is an example of a system for processing image data and transferring the data to a network, to which is applied the interface driver program for a computer relating to the present invention. The constitution of the network image processing system 10 is shown in FIG. 3. As shown in the drawing, the network image processing system 10 minimally comprises two computers 11 and 12; the computers are connected through a network 13. The computer 11 sends image data collected from an external video camera 14 to the computer 12; the computer 12 receives and reproduces this image data.

A capture board 15 and LAN board 16 are inserted in the expansion slots of the computer 11; the external video camera 14 is connected to the capture board 15. Images captured with the video camera 14 are provided to the computer 11 by the capture board 15, and transferred to the computer 12 through the LAN board 16 after image processing and compression in the computer 11. The computer 12 receives the image data from the LAN board 16 connected to the same network 13 and reproduces the image data.

Figure 4:
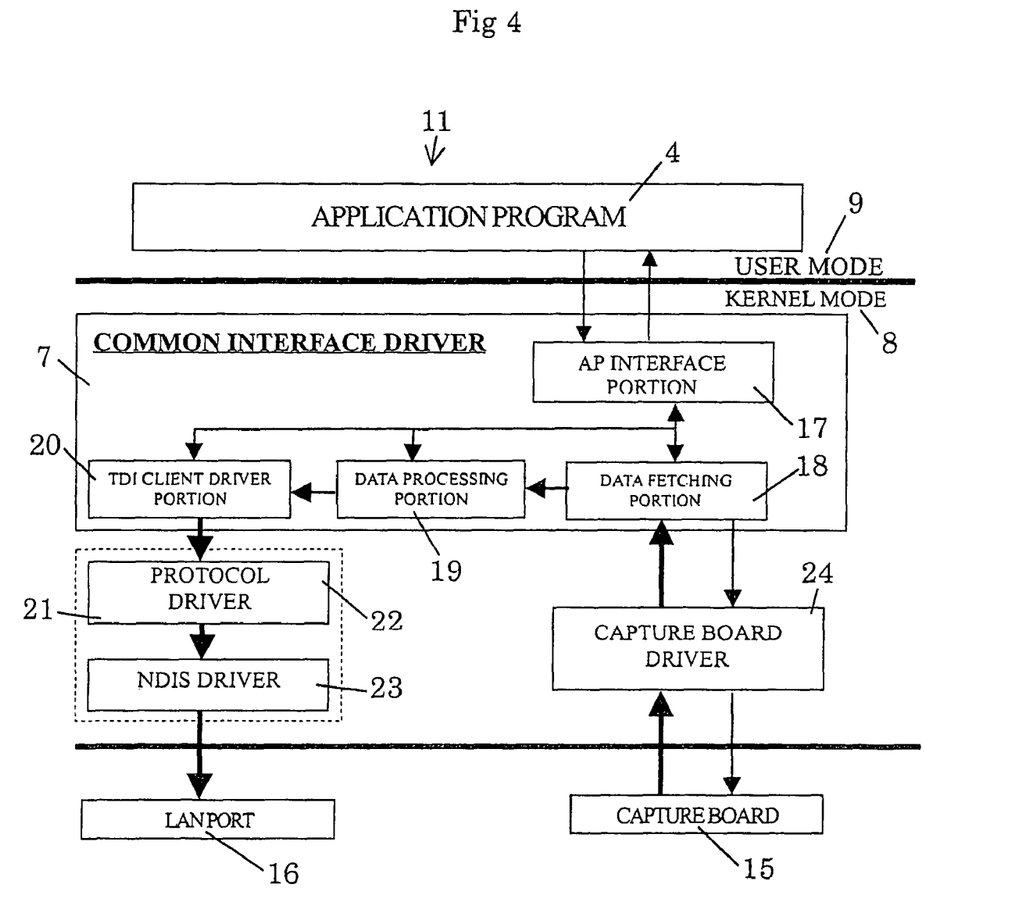
FIG. 4 shows the constitution of the common interface driver of the network image processing system.

In the first embodiment, the operating procedures for a common interface driver 7 operating on a Windows NT/2000 system was explained. FIG. 4 shows the internal constitution of the common interface driver 7 of the computer 11 and the flow of commands and image data. The common interface driver 7 comprises an application (AP) interface portion 17, a data fetching portion 18, a data processing portion 19, and a TDI client driver portion (TDI client driver portion) 20; the functions of each portion are as follows.

The AP interface portion 17 provides an interface between the application program 4 and common interface driver 7, receives and analyzes parameter settings and commands such as for starting operations from the application program 4, passes the operating parameters to various processing portions, and checks the transfer situation of image data. The data fetching portion 18 carries out the process for fetching image data from the capture board 15 through the capture board driver 24.

The capture board driver 24 has the role of controlling the capture board 15 and fetching the image data. The data processing portion 19 compresses the image data from the data fetching portion 18, and performs packetizing by dividing the compressed image data into prescribed lengths for transfer to the network. The TDI client driver portion 20 provides an interface between the LAN driver 21 and the common interface driver 7.

The LAN driver 21 comprises a protocol driver 22 and NDIS (network driver interface specification) driver 23, controls the LAN board 16, and establishes connections and controls protocol when transmitting data to the network 13. The protocol driver 22 controls the communications protocol when transferring data to the network 13.

The NDIS driver 23 provides an interface between the protocol driver 22 and LAN board 16. The TDI client driver portion 20 receives the packetized and compressed image data from the data processing portion 19 and outputs [the data] to the protocol driver 22.

[Operation of the Network Image Processing System]

Figure 5:
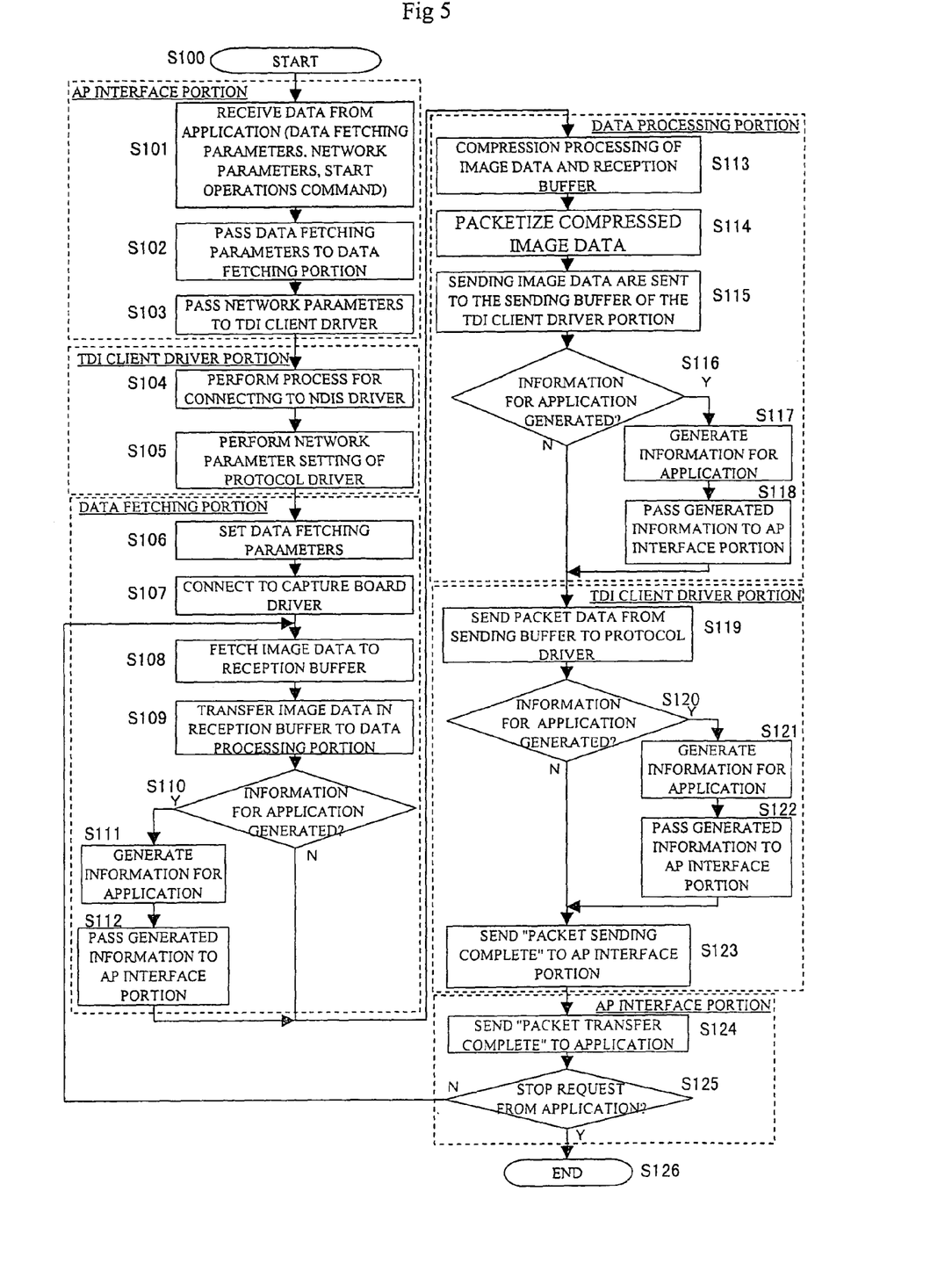
FIG. 5 is a flowchart showing the operating procedures of the common interface driver in FIG. 4.

The operation of the abovementioned first embodiment is explained next. FIG. 5 shows a flowchart of the operating situation of each portion and the flow of data. This flowchart shows the procedures wherein the common interface driver 7 receives image data from the capture board 15, and transmits [the data] to the network 13 through the LAN board 16 according to instructions from the application program 4 operating in the user mode 9. The application program 4 outputs the commands for sending and receiving image data and data transfer begins (S100).

The output command is output to the common interface driver 7 through the interface provided in the standard specifications in Windows. The AP interface portion 17 of the common interface driver 7 receives the command from the application program 4 (S101). The command includes data fetching parameters, network parameters, the start operations command, and so forth.

The AP interface portion 17 passes the data fetching parameters to the data fetching portion 18 (S102), and passes the network parameters to the TDI client driver portion 20 (S103). The TDI client driver portion 20 performs processing to connect to the NDIS driver 23 (S104), and performs the setting of the network parameters of the protocol driver 22 (S105). In this operation, the preparations wherein the image data to be sent are output to the network 13 are completed.

The data fetching portion 18 performs the setting of the data fetching parameters (S106) and the process for connecting to the capture board driver 24 (S107); and the preparations for receiving the image from the video camera 14 are complete. The image data from the capture board 15 are fetched by the reception buffer of the data fetching portion 18 through the capture board driver 24 (S108). The data fetching portion 18 then passes the image data input to the reception buffer to the data processing portion 19 (S109).

When there is a request from the AP interface portion 17 (S110), the data fetching portion 18 generates necessary information such as the image data reception situation, and the progress situation for image data processing (S111), to be sent to the application program 4. [The data fetching portion 18] passes the information generated to the AP interface portion 17 (S112). The compression process for the image data received is performed in the data processing portion 19 (S113).

In order for transfer to the network, the compressed image data are divided into lengths prescribed by the network and packets are generated (S114). The packetized sending image data are sent to the sending buffer of the TDI client driver portion 20 (S115). At this time as well, as in the data fetching portion 18 (S110 through S112), it is possible to generate information such as the compression process situation of image data to the AP interface (S116 through S117), the information generated can be passed to the AP interface portion 17 as well (S118).

The TDI client driver portion 20 sends the sending image data, input to the sending buffer, to the protocol driver 22 (S119). Like with the data processing portion, it is possible to generate information such as for the transfer situation of data to the AP interface portion (S120 through 121). The data generated can be passed to the AP interface portion 17 (S122). The TDI client driver portion 20 sends the information regarding the completion of packet sending to the AP interface portion 17 (S123).

Finally, the AP interface portion 17 notifies the application program 4 of the completion of packet sending (S124), checks for requests from the application program 4 (S125), and when there are no instructions, continues to perform the fetching of image data (S125 to S108). When there is a stop instruction (S125), that command is given to each of the processing portions 17 through 20 and the processing is ended (S126).

[Bar Code Data-URL Address Converting System]

Figure 6:
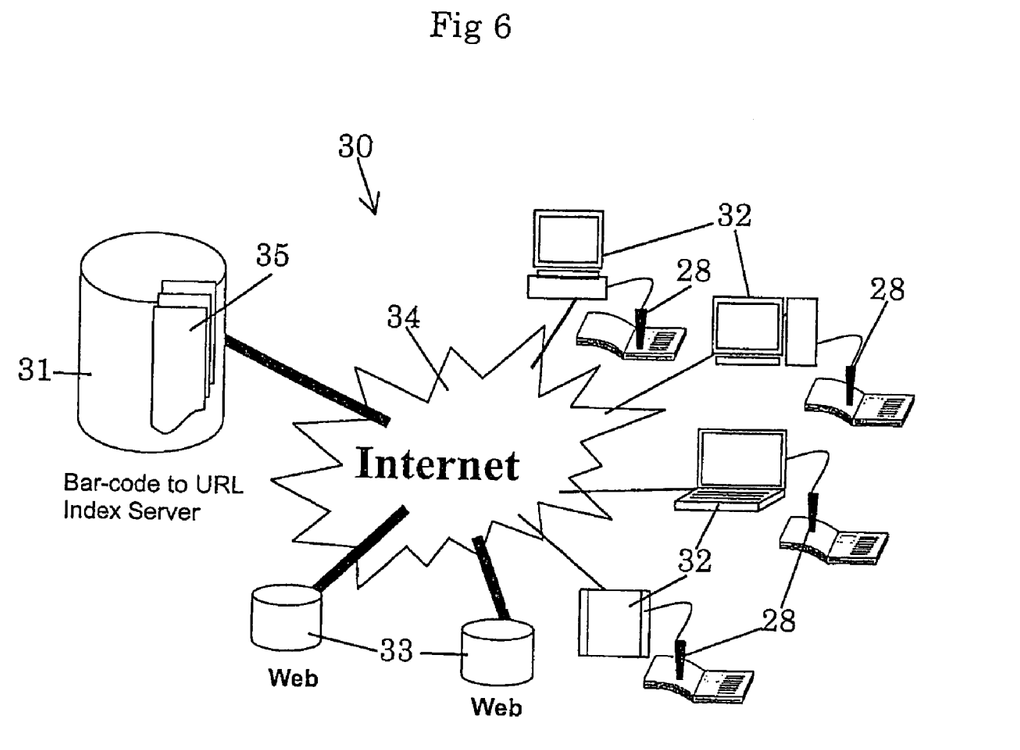
FIG. 6 is a schematic of a bar code data-URL address converting system.

The second embodiment is explained next: the interface driver program for a computer relating to the present invention applied to a system for converting bar code data to a URL (universal resource locator) address and viewing the home page at that URL on a Web browser. A constitution of the bar code data-URL address converting system 30 is as shown in FIG. 6.

In the bar code data-URL address converting system 30, a bar code to URL index server (hereinafter "index server") 31, a Web server (hereinafter "server") 33 corresponding to that URL address, and user terminals 32 for reading bar codes are connected by the Internet. A bar code reader 28 is connected to each user terminal 32. A database 35 wherein URL address information corresponding to bar code data is registered in advance is prepared on the index server 31.

The index server 31 is a server for receiving bar code data sent from the Internet 34, and returning the URL address corresponding to that bar code data by searching the database 35. The server 33 is a Web server on the regular Internet containing Web pages. The bar code reader 28 is an apparatus for reading bar codes printed on printed matter such as catalogs.

The user terminal 32 receives bar code data read with in the bar code reader 28 and performs data encryption processing, and then sends [the data] to the index server 31 on the Internet 34. The user terminal 32 receives the URL address corresponding to the encrypted bar code data from the index server 31, starts the web browser, and displays the web page corresponding to that URL address. The user terminal 32 may be a desktop personal computer, or a portable terminal such as a notebook computer or PDA.

Figure 7:
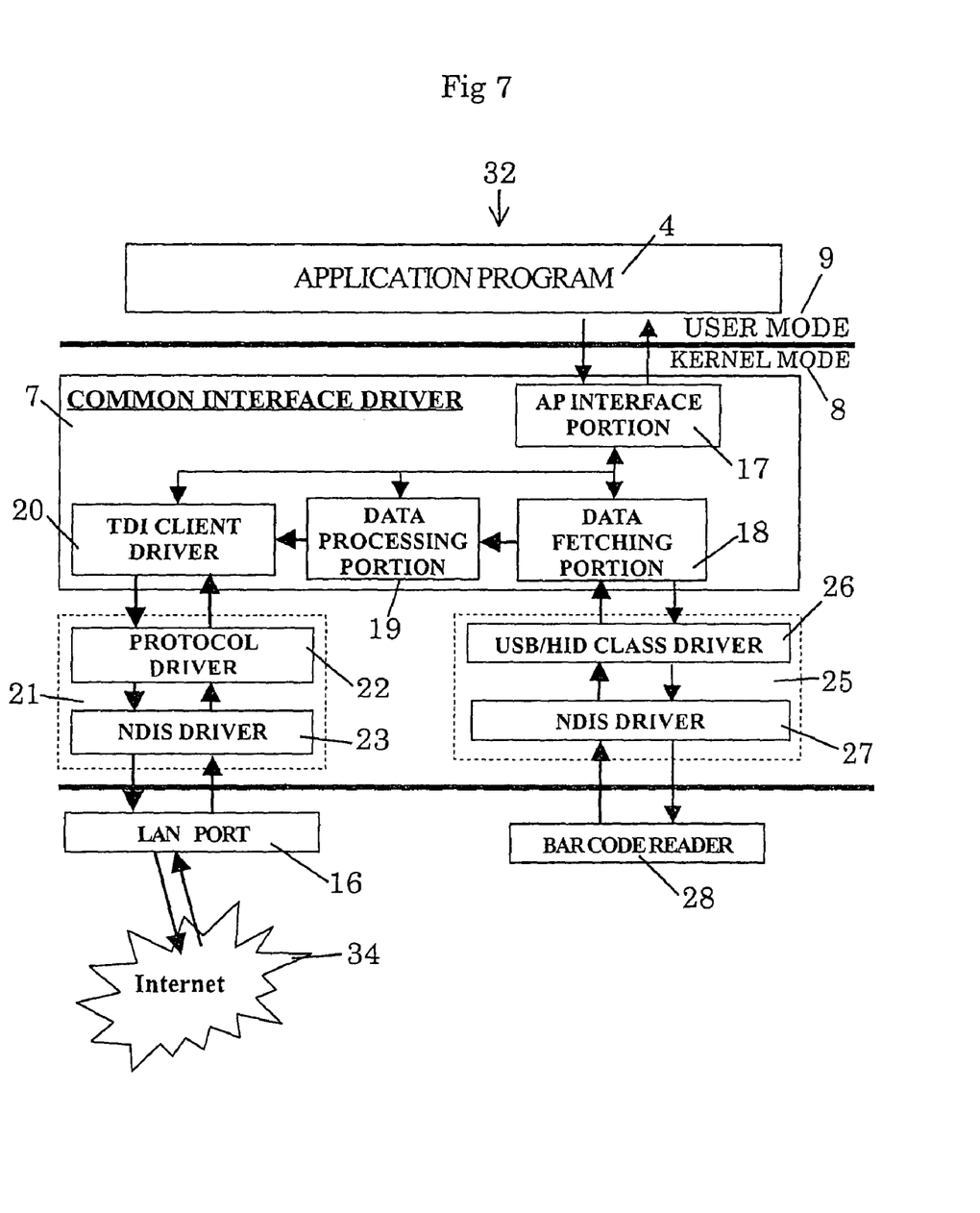
FIG. 7 shows the constitution of the common interface driver of the bar code data-URL address converting system.

The user terminal 32 may be any type of computer having the functions for sending the input bar code information to the Internet 34, receiving the URL address information corresponding thereto, and displaying Web pages. The operation of this system on the user terminal 32 is explained next using an example of the Windows NT/2000 OS. FIG. 7 shows a schematic of the common interface driver 7 operating on the user terminal 32.

The common interface driver 7 comprises the AP interface portion 17, data fetching portion 18, data processing portion 19, and TDI client driver portion 20. The data fetching portion 18 is for fetching bar code data from the bar code reader 28 through the USB/HID driver 25. The data processing portion 19 processes and performs encryption processing for the bar code data fetched with the data fetching portion 18. At the same time, information of the index server 31 from the AP interface portion 17 is also received and is divided into prescribed lengths, and packets of transferred data are generated.

The TDI client driver portion 20 has the purpose of providing an interface with the protocol driver 22 and outputting packetized data from the encryption processing portion to the LAN driver 21. At the same time, the TDI client driver portion has a function for passing URL address information attained from the index server 31 to the interface portion 17. The AP interface portion 17 becomes the means of access to the common interface driver 7 and provides an interface with the application program 4.

The AP interface portion 17 receives commands from the application program 4, analyzes the commands, outputs instructions to the data fetching portion 18, data processing portion 19, and TDI client driver portion 20, and provides information from each portion to the application program 4. Specifically, the AP interface portion 17 receives commands such as for setting parameters on the index server 31 from the application program 4 and returns URL address information, corresponding to the bar code data, to the application program 4.

The start and end commands for the device driver 5 are issued according to instructions from the application program 4. Also, there is a function for returning information such as the operating situation of the device driver 5 to the application program 4. That common interface driver 7 is able to access the Internet 34 directly or via a LAN through the protocol driver 22. The application program 4 is able to control the starting, stopping, and reception of parameters of other application programs such as the web browser.

[Operation of the Bar Code Data-URL Address Converting System]

Figure 8:
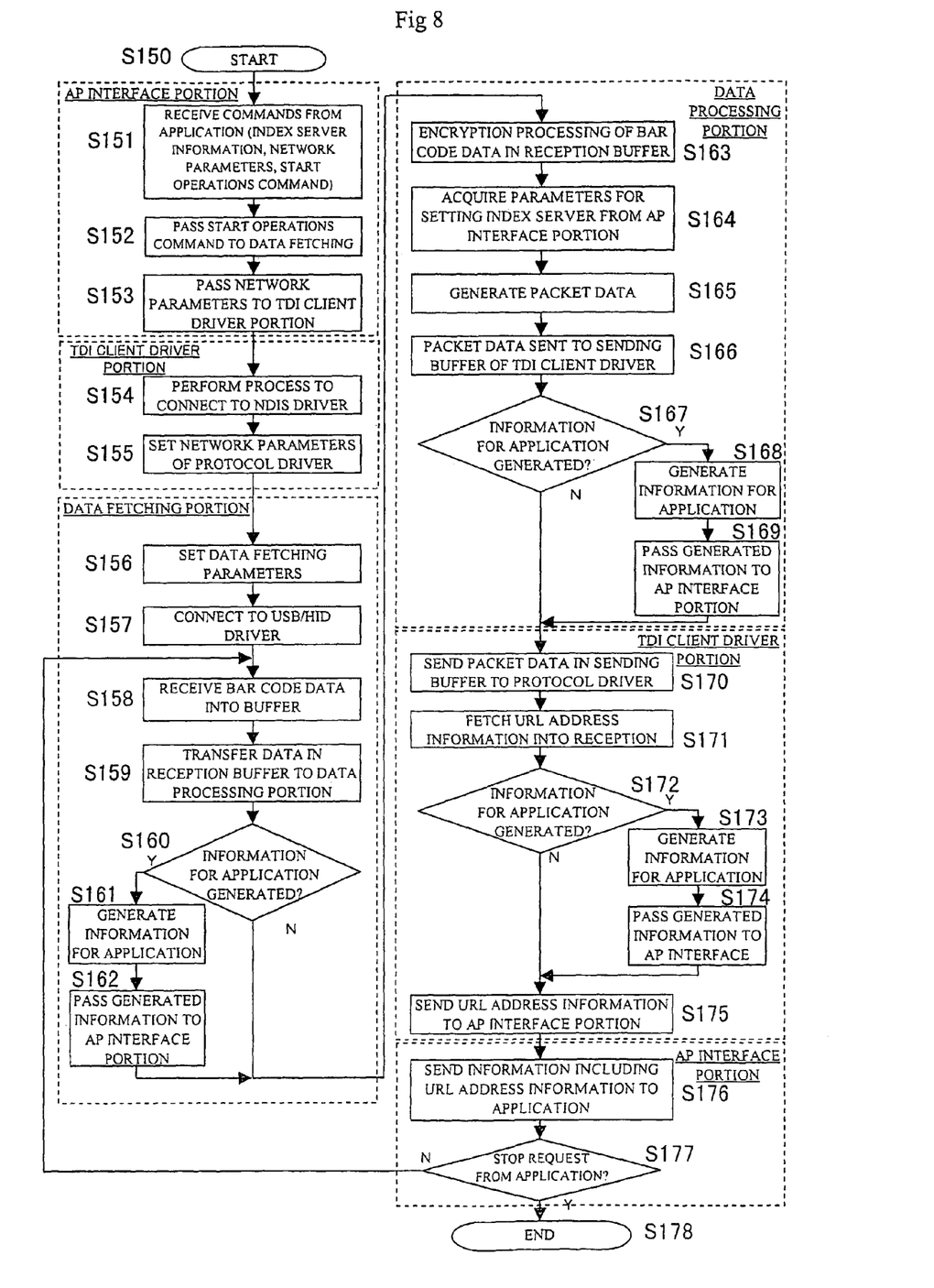
FIG. 8 is a flowchart showing the operating procedures of the common interface driver in FIG. 7.

The operation procedures of the common interface driver are explained with reference to FIG. 8. The application program 4 running in the user mode 9 receives bar code data from the bar code reader 28, sends [the data] to the index server 31 on the Internet 34, receives URL information from the index server 31, and causes the web browser to start and display the page at that URL address. The application program 4 outputs sending and receiving commands (S150).

These commands are output through the standard interface provided by Windows. The AP interface portion 17 of the common interface driver 7 receives commands from the application program 4 (S151). The commands include setting parameters for the index server 31, network parameters, and a start operations command. The AP interface portion 17 passes the start operations command to the data fetching portion 18 (S152), and passes the network parameters to the TDI client driver portion 20 (S153).

The TDI client driver portion 20 performs processing to connect to the NDIS driver 23 (S154) and performs the setting of network parameters for the protocol driver 22 (S155). The preparations for accessing the Internet 34 are complete with this operation. The data fetching portion 18 performs the setting of data fetching parameters at the start operations command (S156) and performs the processing to connect to the USB/HID driver 25 (S157), and the preparations for fetching bar code data from the bar code reader 28 are ended.

The bar code data from the bar code reader 28 are received by the reception buffer of the data fetching portion 18 through the USB/HID lower-level driver 27 and the USB/HID class driver 26 (S158). The data fetching portion 18 passes the bar code data input to the reception buffer to the data processing portion 19 (S159). When there is an information provision request from the application program 4 (S160), the data fetching portion 18 generates information to output to the application program 4 such as the situation of receiving bar code data (S161).

The information generated is passed to the AP interface portion 17 (S162). In the data processing portion 19, the bar code data received are processed and undergo encryption processing (S163), and the setting parameters and so forth for the index server 31 are received from the AP interface portion 17 (S164). The encrypted bar code data and setting parameters for the index server 31 are joined and divided into prescribed lengths, and packet data are generated (S165). The packet data generated are sent to the sending buffer of the TDI client driver portion 20 (S166).

As with the data fetching portion 18, when there is a data provision request from the application program 4 (S167), information such as the data processing situation to be output to the application program 4 is generated by the data processing portion 19 (S168) and that information is passed to the AP interface portion 17 (S169). The TDI client driver portion 20 sends the data input to the sending buffer to the protocol driver 22 (S170).

The URL address sent through the protocol driver 22 from the index server 31 enters the reception buffer (S171). When there is a data provision request from the application program 4, information on the reception situation is generated and passed to the AP interface portion 17 (S172 through S174). The URL address information in the reception buffer is sent to the AP interface portion 17 (S175). The AP interface portion 17 generates information including the URL address information to go to the application program 4 and sends that information to the application program 4 (S176).

The AP interface portion 17 then waits for a request from the application program 4. When there are no instructions, the fetching of bar code data is carried out continuously (S177>S158). When there is a stop instruction, that command is provided to each processing portion and [the process] ends (S178).

The present invention has the following effects.

The sending and receiving of data among devices can be carried out safely and at high speeds by establishing a common interface driver which can control various types of device drivers included in the OS with a single common device driver between the device drivers.

The frequency of switching between the user mode wherein the application programs operate and the kernel mode wherein the device drivers operate is reduced and data transfer speeds become high. By establishing a common interface driver, speed is increased for the processing of the computer to fetch image data and transfer [the data] to a network.

By handling various types of data such as bar code information in the kernel mode, the security of the information data is increased and safety is improved. By establishing a common interface driver, a standardized environment for developing drivers can be provided and the development time and costs can be reduced.

What is claimed is:

1. An interface driver program for a computer operates according to an operating system comprising:

device drivers for controlling devices, when data are sent and received among said devices according to commands output from an application program running on a computer, a common interface the sending and receiving of data or commands from said application program to said device drivers;

wherein said devices comprise a first device and second device;

a first device driver for controlling said first device is present;

a second device driver for controlling said second device is present; and the interface driver program comprises:

application interface means for receiving commands from said application program and notifying said application program of the results of executing the commands;

first interface means for fetching received data from said first device driver;

second interface means for sending the sending data to said second device driver; and data processing means for processing said received data, generating said sending data, and passing said sending data to said second interface means;

said operating system has the operating modes of a kernel mode, wherein all commands for operating said operating system are executable, and has a user mode, wherein only some of said commands are executable; and said interface driver program for a computer operates in said kernel mode;

said first device is a bar code reading device for reading bar code data;

said second device is a network card for connecting to a network and sending said bar code data to said network;

said first interface means fetches said bar code data from said bar code reading device;

said data processing means processes said bar code data sent from said first interface means, and generate sending bar code data to be sent to said network; and said second interface means sends said sending bar code data from said data processing means to said network, wherein an index server, which has a function for converting said bar code data to universal resource locator address data, is present on said network;

said second interface means acquire said universal resource locator address data from said index server through said network card; and said application interface means pass said universal resource locator address data to said application program.

2. The interface driver program for a computer, according to claim 1, wherein said network is the Internet.

3. A recording medium having recorded thereon an interface driver program for a computer operates according to an operating system comprising:

device drivers for controlling devices, and when data are sent and received among said devices according to commands output from an application program running on a computer, a common interface the sending and receiving of data or commands from said application program to said device drivers;

wherein said devices comprise a first device and second device;

a first device driver for controlling said first device is present;

a second device driver for controlling said second device is present; and the interface driver program comprises:

application interface means for receiving commands from said application program and notifying said application program of the results of executing the commands;

first interface means for fetching received data from said first device driver;

second interface means for sending the sending data to said second device driver; and data processing means for processing said received data, generating said sending data, and passing said sending data to said second interface means;

said operating system has the operating modes of a kernel mode, wherein all commands for operating said operating system are executable, and has a user mode, wherein only some of said commands are executable; and said interface driver program for a computer operates in said kernel mode;

said first device is a bar code reading device for reading bar code data;

said second device is a network card for connecting to a network and sending said bar code data to said network;

said first interface means fetches said bar code data from said bar code reading device;

said data processing means processes said bar code data sent from said first interface means, and generate sending bar code data to be sent to said network; and said second interface means sends said sending bar code data from said data processing means to said network, wherein an index server, which has a function for converting said bar code data to universal resource locator address data, is present on said network;

said second interface means acquire said universal resource locator address data from said index server through said network card; and said application interface means pass said universal resource locator address data to said application program.

4. The recording medium having recorded thereon an interface driver program for a computer, according to claim 3, wherein said network is the Internet.

* * * * *